(12) United States Patent
Manasson et al.

(10) Patent No.: US 11,121,465 B2
(45) Date of Patent: Sep. 14, 2021

(54) STEERABLE BEAM ANTENNA WITH CONTROLLABLY VARIABLE POLARIZATION

(71) Applicant: SIERRA NEVADA CORPORATION, Sparks, NV (US)

(72) Inventors: Vladimir A. Manasson, Irvine, CA (US); Lev S. Sadovnik, Irvine, CA (US)

(73) Assignee: Sierra Nevada Corporation, Sparks, NV (US)

( * ) Notice: Subject to any disclaimer, the term of this patent is extended or adjusted under 35 U.S.C. 154(b) by 266 days.

(21) Appl. No.: 16/003,639

(22) Filed: Jun. 8, 2018

(65) Prior Publication Data

US 2019/0379120 A1 Dec. 12, 2019

(51) Int. Cl.
*H01Q 3/00* (2006.01)
*H01Q 3/36* (2006.01)
(Continued)

(52) U.S. Cl.
CPC ............ *H01Q 3/36* (2013.01); *H01Q 3/01* (2013.01); *H01Q 3/2635* (2013.01);
(Continued)

(58) Field of Classification Search
CPC .......... H01Q 3/36; H01Q 3/01; H01Q 3/2635; H01Q 3/24; H01Q 21/24; H01Q 21/0006; H01Q 21/245; H01Q 15/244; H01Q 15/24; H01Q 9/0492; H01Q 25/00; H04B 7/0602; H04B 7/0686; H04B 7/10; H04B 7/0408
(Continued)

(56) References Cited

U.S. PATENT DOCUMENTS 5,515,059 A * 5/1996 How ................. H01Q 3/44
342/372
7,113,748 B2 * 9/2006 Shapira ............. H01Q 1/246
342/361
(Continued)

OTHER PUBLICATIONS

International Search Report on related PCT application (PCT/US2019/034732) from International Searching Authority (USPTO) dated Aug. 8, 2019.
(Continued)

*Primary Examiner* — Chuong P Nguyen
(74) *Attorney, Agent, or Firm* — Klein, O'Neill & Singh, LLP (57) ABSTRACT

A steerable beam antenna includes a feed line and first and second arrays of switchable scatterers along opposite sides of the feed line. The first array scatters an electromagnetic wave propagating through the feed line to form a first beam portion with a first polarization, and the second array scatters the propagating wave to form a second beam portion with a second polarization orthogonal to the first polarization. Each scatterer in the first and second arrays is switchable between a high state and a low state, the high state scatterers and the low-state scatterers in each of the first and second arrays defining a periodic pattern. The scatterers in the first and second arrays are switchable to shift the pattern of scatterers
(Continued)

in one of the arrays relative to the pattern in the other array by a selectable period shift that yields a desired polarization for the beam.

12 Claims, 6 Drawing Sheets

(51) Int. Cl.

| | |
|---|---|
| *H01Q 3/26* | (2006.01) |
| *H01Q 3/01* | (2006.01) |
| *H01Q 21/00* | (2006.01) |
| *H01Q 21/24* | (2006.01) |
| H01Q 15/24 | (2006.01) |
| H01Q 3/24 | (2006.01) |
| H01Q 25/00 | (2006.01) |

(52) U.S. Cl.
CPC ....... *H01Q 21/0006* (2013.01); *H01Q 21/245* (2013.01); *H01Q 3/24* (2013.01); *H01Q 15/24* (2013.01); *H01Q 15/244* (2013.01); *H01Q 21/24* (2013.01); *H01Q 25/00* (2013.01)

(58) Field of Classification Search
USPC ........................................ 342/361, 368, 374
See application file for complete search history.

(56) References Cited

U.S. PATENT DOCUMENTS

| | | | |
|---|---|---|---|
| 8,982,313 B2* | 3/2015 | Escuti | G02F 1/292 |
| | | | 349/202 |
| 9,537,214 B2* | 1/2017 | Corman | H01Q 15/242 |
| 9,698,478 B2* | 7/2017 | Manasson | H01Q 3/24 |
| 10,461,836 B2* | 10/2019 | Petersson | H04B 7/043 |
| 2003/0162566 A1* | 8/2003 | Shapira | H04B 7/10 |
| | | | 455/561 |
| 2005/0075139 A1 | 4/2005 | Shapira | |
| 2009/0322611 A1 | 12/2009 | Manasson et al. | |
| 2011/0285582 A1 | 11/2011 | Zhang et al. | |
| 2012/0212372 A1* | 8/2012 | Petersson | H04B 7/043 |
| | | | 342/373 |
| 2015/0236412 A1 | 8/2015 | Bily et al. | |
| 2015/0357711 A1* | 12/2015 | Manasson | H01Q 13/28 |
| | | | 342/374 |
| 2016/0372834 A1* | 12/2016 | Bily | H01Q 15/0066 |
| 2019/0312350 A1* | 10/2019 | Avakian | H01Q 3/247 |
| 2020/0036433 A1* | 1/2020 | Petersson | H01Q 3/26 |

OTHER PUBLICATIONS

Written Opinion on related PCT application (PCT/US2019/034732) from International Searching Authority (USPTO) dated Aug. 8, 2019.

\* cited by examiner

CL-Polarization $$\Delta P = d = \frac{P}{4}$$

FIG. 2C

CR-Polarization $$\Delta P = 3d = 3\frac{P}{4}$$

FIG. 5

STEERABLE BEAM ANTENNA WITH CONTROLLABLY VARIABLE POLARIZATION

CROSS-REFERENCE TO RELATED APPLICATIONS

Not Applicable

FEDERALLY SPONSORED RESEARCH OR DEVELOPMENT

Not Applicable

BACKGROUND

The present disclosure relates to directional or steerable beam antennas, of the type employed in such applications as radar and communications. More specifically, it relates to leaky-waveguide antennas, of the type including a dielectric feed line (i.e., a potentially leaky waveguide) loaded with scatterers (antenna elements), where coupling between the scatterers and the feed line can be altered by switches, whereby the antenna's beam shape and direction are determined by the pattern of the switches that are respectively turned on and off.

Steerable beam antennas, particularly leaky-wave antennas, are capable of sending electromagnetic signals in, and receiving electromagnetic signals from, desired directions. Such antennas are used, for example, in various types of radar, such as surveillance radar and collision avoidance radar. In such antennas, the receiving or transmitting beam is generated by a set of scatterers coupled to the feed line or waveguide. Interacting with the feed line, the scatterers create leaky waves propagating outside of the feed line. If the scatterers are properly phased, they create a coherent beam propagating in a specific direction. The leakage strength and phase caused by each scatterer depend on the geometry and location of the scatterer relative to the feed line or waveguide. The coupling strength can be controlled by changing the geometry of the scattering elements. Correspondingly, the shape and direction of the scattered beam can be controlled by varying the scatterer geometry or topology. The geometry (topology) of the scatterers can be electronically altered by using microwave (or other suitable) switches connecting parts of the scatterers. Thus, the shape and direction of the antenna beam can be controlled electronically by changing the state of the switches. Different ON/OFF switch patterns result in different beam shapes and/or directions.

Any of several types of switches integrated into the structure of the antenna elements or scatterers may be used for this purpose, such as semiconductor switches (e.g., PIN diodes, bipolar and MOSFET transistors, varactors, photodiodes and photo-transistors, semiconductor-plasma switches, phase-change switches), MEMS switches, piezoelectric switches, ferro-electric switches, gas-plasma switches, electromagnetic relays, thermal switches, etc. For example, semiconductor plasma switches have been used in antennas described in U.S. Pat. No. 7,151,499, the disclosure of which is incorporated herein by reference in its entirety. A specific example of an antenna in which the geometry of the scattering elements is controllably varied by semiconductor plasma switches is disclosed and claimed in U.S. Pat. No. 7,777,286, the disclosure of which is incorporated herein in its entirety. Another example of a currently-available electronically-controlled steerable beam antenna using switchable antenna elements (scatterers) is disclosed in U.S. Pat. No. 7,995,000, the disclosure of which is incorporated herein its entirety.

U.S. Pat. No. 9,698,478, the disclosure of which is incorporated herein by reference in its entirety, is assigned to the assignee of this disclosure. That patent discloses an electronically-controlled steerable beam antenna system, of the general type described above, comprising a feed line or transmission line defining an axis x; and first and second arrays of electronically-controlled switchable scatters distributed along the axis x, each of the scatterers in the first and second arrays being switchable between a "high" scattering state and a "low" scattering state to scatter an electromagnetic wave propagating through the feed line so as to form a steerable antenna beam. The high state/low state scatterer pattern of the first array is advantageously quasi-periodic. The output beam position is controlled by varying the period.

More specifically, in the antenna disclosed in the above-mentioned '478 patent, the scatterers of the first array are configured to scatter an electromagnetic wave propagating through the feed line. The high-state scatterers in the first array follow a quasi-periodic pattern with a period P=nd, where n is the number of scatterers per period (including both low-state scatterers and high-state scatterers), and where d is the spacing between adjacent scatterers along the axis x. The high-state scatterers in the second array follow the similar quasi-periodic pattern, with the same period P, but the pattern of the second array can be shifted along the x axis relative to the pattern of the first array.

The antenna beam direction φ is determined by the period P and the wave propagation speed v in the antenna feed line:

$$\sin\varphi = \frac{c}{v} - \frac{\lambda}{P}$$

where c is the speed of light, and λ is the free-space wavelength of the beam.

While the above-described antenna of the '478 patent achieves its intended results, it produces a steerable beam with only a single fixed polarization. It would be desirable, for many applications, to allow this type of antenna to provide for multiple controllable polarizations.

SUMMARY

In some aspects, this disclosure relates to a steerable beam antenna, wherein the antenna is controllably operable to produce a steerable beam in any of several selectable polarizations. In accordance with these aspects, a steerable beam antenna system comprises a feed line or transmission line defining an axis X; and first and second arrays of electronically-controllable switchable scatters distributed on opposite sides of the feed line parallel to the axis X, each of the scatterers in the first and second arrays being switchable between a "high" scattering state and a "low" scattering state to scatter an electromagnetic wave propagating through the feed line so as to form a steerable antenna beam. The high state/low state scatterer patterns of the first and second arrays are advantageously quasi-periodic, and the output beam direction is controlled by varying the scatterer period, as in the antenna disclosed in the above-mentioned '478 patent. In accordance with this disclosure, however, with the scatterers of the first array configured to provide an antenna output having a first polarization, the scatterers of the second array are configured so that the portion of the antenna output scattered by the second array has a second polarization orthogonal to the first polarization of the portion scattered by the first array. More specifically, while the high state/low state scatterer patterns of both the first and second arrays have the same period (which, for the purpose of this disclosure, is denoted "P"), the pattern of the second array may be shifted along the axis X defined by the feed line by a period shift $\Delta P$. The resulting polarization of the antenna beam (from both arrays) depends on the value of $\Delta P$. In embodiments of this disclosure, a linear polarization parallel to the feed line axis occurs when there is no period shift ($\Delta P=0$); a period shift of $\Delta P=\pm P/2$ (phase shift=) 180° yields a linear polarization orthogonal to the feed line axis; a left-hand circular polarization is produced when the period shift is $\Delta P=P/4$ (phase shift=90°); and a right-hand circular polarization is produced when the period shift is $\Delta P=3P/4$ (phase shift=270°). If a non-zero period shift ($\Delta P$) is not commensurate with an integral multiple of the spacing d between adjacent scatterers along the axis X, it should be approximated as the closest integral multiple to minimize the deviation from precisely linear or circular polarization, as the case may be. To this end, the distance d between the scatterers should be as small as possible: no greater than ⅓ the wavelength $\lambda$ of the radiated beam, and preferably less than $\lambda/4$.

The scatterers in the first and second arrays are switched, preferably under electronic control, between the high state and the low state. The value of $\Delta P$ can be selectively varied in a prescribed sequence, for example, by selectively switching the appropriate scatterers in the second array between their high states and low states by electronic switches that can be actuated, for example, under the control of a suitably programmed processor. This arrangement would yield polarizations that would be varied in accordance with the prescribed sequence. Alternatively, the scatterers in the second array can be operated in their respective high states and low states in a specific period shift yielding a first polarization, until their high states and low states are switched to a different period shift yielding a second polarization. In either case, a polarization state can be selected to optimize performance of the antenna beam in a particular situation or application. If the inter-scatterer spacing d is small enough, this approach allows the generation of radiated beams with the desired mix of linear and circular polarizations (including various elliptical polarizations).

In accordance with embodiments of this disclosure, the above-described polarization results can be achieved with the scatterers of both the first and second arrays being shaped as either monopoles or dipoles. The scatterers of the first array are parallel to each other, each forming an angle $\alpha$ with the feed line axis, while the scatterers of the second array are parallel to each other, each forming an angle $-\alpha$ with the feed line axis. The angle $\alpha$ is selected so that each scatterer radiates with a linear polarization of 45° relative to the feed line axis.

DETAILED DESCRIPTION

Figure 1:
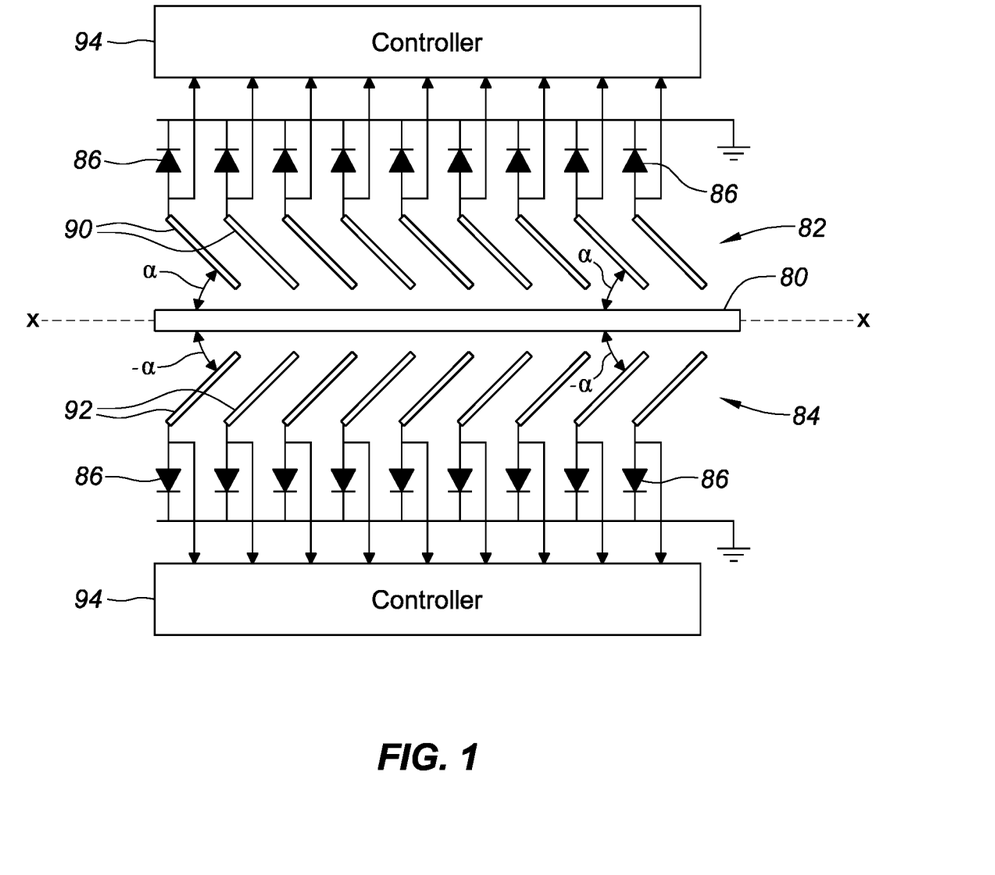
FIG. 1 is a schematic diagram of an electronically controllable steerable beam antenna in accordance with aspects of this disclosure, showing first and second scatterer arrays on opposite sides of a feed line defining an axis X, with the scatterers connected to a controller through a switch network for controllably varying the polarization of the radiated beam.

FIG. 1 diagrammatically illustrates a steerable beam antenna with an arrangement of scatterers or pixels in accordance with aspects of this disclosure that provides multiple controllable polarizations for a steerable radiated beam. In this aspect, the scatterers may be monopoles or dipoles, but, for simplicity of this discussion, they shall be assumed to be monopoles.

In this aspect, an electromagnetic signal feed line 80 defines an X axis, with a first linear array 82 of scatterers or pixels 90 and a complementary linear second array 84 of scatterers or pixels 92 arranged on opposite sides of the feed line 80 parallel to the X axis. Each of the scatterers 90 in the first array 82 and each of the scatterers 92 in the second array 84 is switchable (preferably by electronic control) between a high state (H-state, represented by a "1" in the drawings) and a low state (L-state, represented by a "0" in the drawings) to scatter a wave propagating through the feed line 80 so as to form a steerable antenna beam, in which the beam direction is controlled via the period of the reciprocating patterns of the H-state scatterers and the L-state in the first and second arrays, respectively. More specifically, each of the scatterers 90 in the first array 82 and each of the scatterers 92 in the second array 84 may be implemented as a short linear segment of a microstrip line, formed as, for example, as a conductive trace on a suitable substrate by known circuit fabrication methods.

The scatterers 90 of the first array 82 are parallel to each other, with each scatterer 90 forming an angle $\alpha$ relative to the X axis defined by the feed line 80. The scatterers 92 of the second array 84 are likewise parallel to each other, with each scatterer 92 forming an angle $-\alpha$ relative to the X axis, whereby the first and second arrays are mirror images of each other, with the feed line 80 as a mirror plane. The magnitude of the angle $\alpha$ is selected so that the output radiation is linearly polarized at 45° relative to the feed line 80, with the scatterers of the first array providing a first scattered beam portion having a first polarization, and the scatterers in the second array providing a second scattered beam portion having a second polarization orthogonal to the first polarization. The value of a is nominally 45°, but it will depend on, for example, the dielectric constant and geometry of the feed line. In addition, factors such as RF interference between the scatterers and the feed line, ground, and other antenna elements, as well as interference between active and passive scatterers, may require the dipole/monopole orientations (angle $\alpha$) to deviate from 45° relative to the feed line axis to obtain orthogonal polarizations between the first and second arrays of scatterers. The scatterers in each array are equidistantly spaced from each other by a separation distance d that is as small as possible: no greater than one-third the wavelength λ of the radiated beam, and preferably less than λ/4, such as, for example, λ/8 or λ/16, or even less.

Each of the scatterers in the first array 82 and the second array 84 is controllably connectable to ground by a switch 86 that may be implemented, for example, by a PIN diode. Although shown schematically as diodes, the switches 86 can be implemented as controllable resistors, MEMs, MOSFETSs, or any other suitable switching component. The switches 86 can be implemented as separate lumped elements, or integrated into the substrate, as when the antenna is formed on a semiconductor (e.g., silicon) wafer. They can be controlled electronically, photo-electrically, thermo-electrically, magneto-electrically, or electro-mechanically, depending on the needs of any particular application. As shown, a switch 86 is associated with each of the scatterers in both the first array 82 and the second array 84.

Switching a switch 86 to ground (e.g., closing the switch) transitions its associated scatterer from the L-state (0) to the H-state (1), while opening the switch (disconnecting its associated scatterer from ground) transitions its associated scatterer from the H-state (1) to the L-state (0). The switches 86 in each array may advantageously be operated in response to a control signal from a controller 94 that, in some embodiments, operates the switches 86 in accordance with a software program that is retrieved from memory (not shown) or is otherwise input to the controller 94. The controller 94 itself, in many embodiments, will be implemented as a programmable processor, whereby the processor is configured by instructions in the program to perform the switch operations needed to implement the selectable radiation polarizations in accordance with this disclosure, as explained below.

Generally, the pattern of H-state scatterers and L-state scatterers in the first array 82 will have a first correlation to the pattern in the second array 84 that produces a radiated beam having a first type of polarization. The pattern of at least one of the arrays is shifted relative to the pattern of the other array, by appropriate actuation of the switches 86, by a period shift ΔP that results in a second correlation that produces a beam having a selectable second type of polarization.

By way of specific example, FIGS. 2A, 2B, 2C, and 2D illustrate how the polarization of the output beam can be controllably varied by shifting the pattern of H-state and L-state scatterers 90 in the first array 82 relative to the corresponding pattern of the scatterers 92 in the second array 84, or vice versa. The shifting is done by actuating the switches 86 of the appropriate scatterers in the either the first array 82 or the second array 84 to achieve the pattern shifts corresponding to the desired polarization. In the exemplary embodiment shown in these figures, the period P of each array is nd, where n is the number of scatterers between successive H-state scatters (4 in the illustrated example) and d is the separation distance between each adjacent pair of scatterers. While n can be any integer greater than 1, in the illustrated example, each period consists of three successive L-state scatterers or pixels and one H-state scatterer or pixel. Thus, a quarter period (nd/4) will encompass one scatterer or pixel.

Figure 2A:
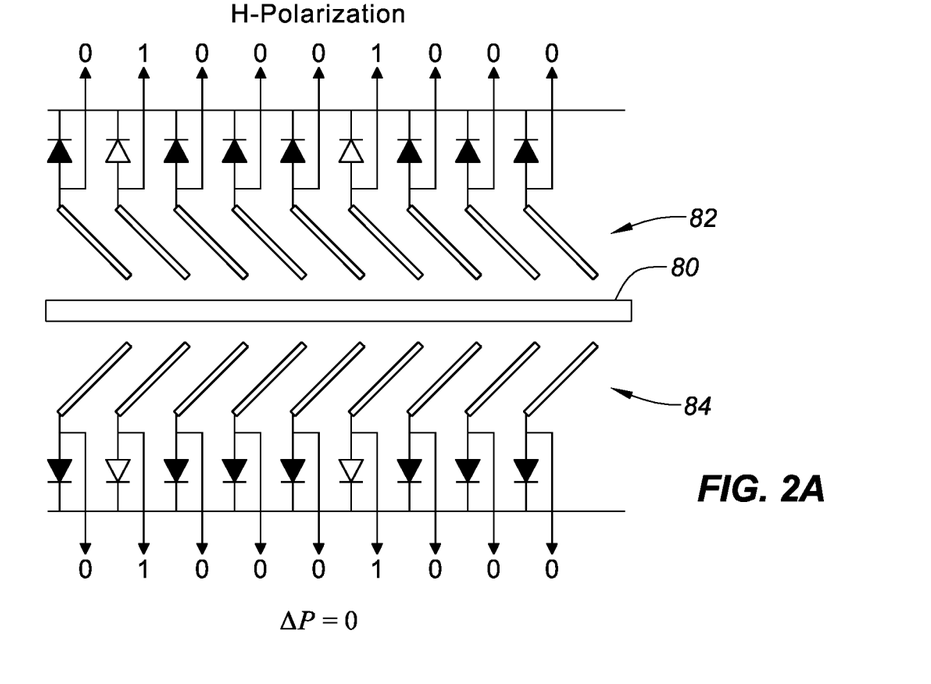
FIGS. 2A-2D are schematic diagrams, similar to FIG. 1, showing the scatterers in each array arranged in a high-state/low state configuration with a period of 4d, showing the patterns of high states and low states in the first and second scatterer arrays that yield linear and circular beam polarizations.

In FIG. 2A, the pattern of H-state scatterers and L-state scatterers is the same in the second array 84 as it is in the first array 82, indicated a "zero-shift" (i.e., ΔP=0) of the second array 84 relative to the first array 82. In this configuration, the beam polarization provided by both arrays is linear, with the polarization components produced by both arrays in a direction orthogonal to axis X canceling each other. The resultant output beam has a linear polarization in a direction parallel to the X-axis (which may be referred to as "horizontal" or "H" polarization).

Figure 2B:
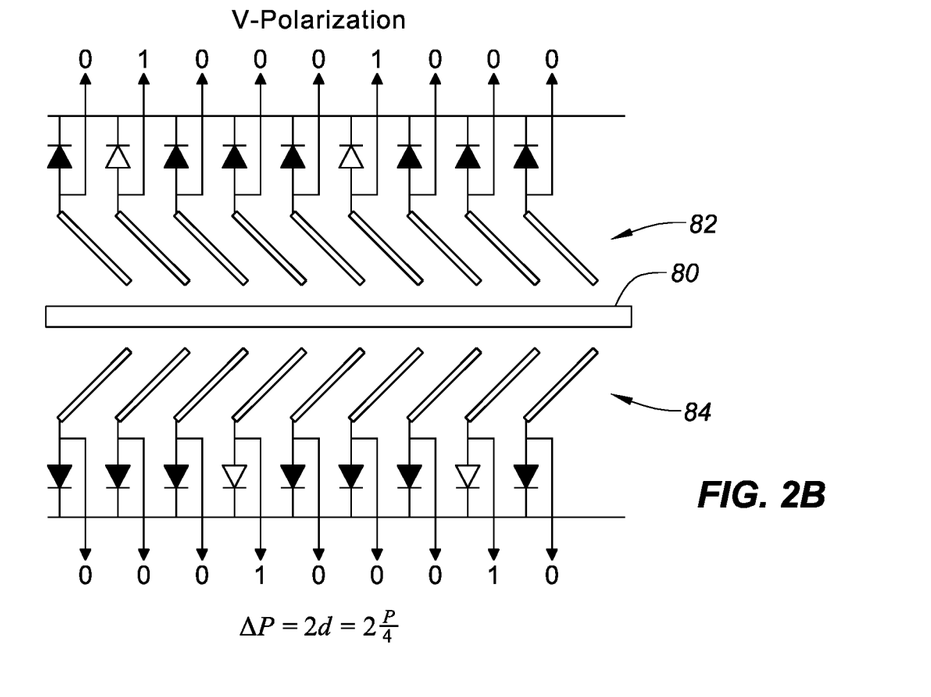

FIG. 2B shows the scatterer pattern in the second array 84 shifted by P/2 (i.e., ΔP=2d, where P=4d) relative to the scatterers in the first array 82. In this configuration, the resultant output beam is linearly polarized in the direction orthogonal to the X-axis (which may be referred to as "vertical" or "V" polarization).

Figure 2C:
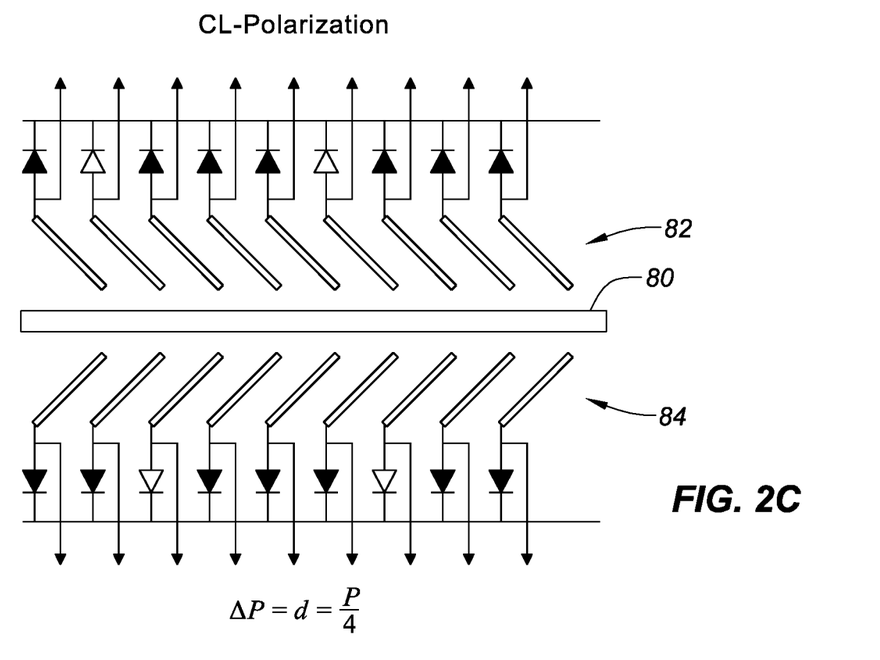
Figure 2D:
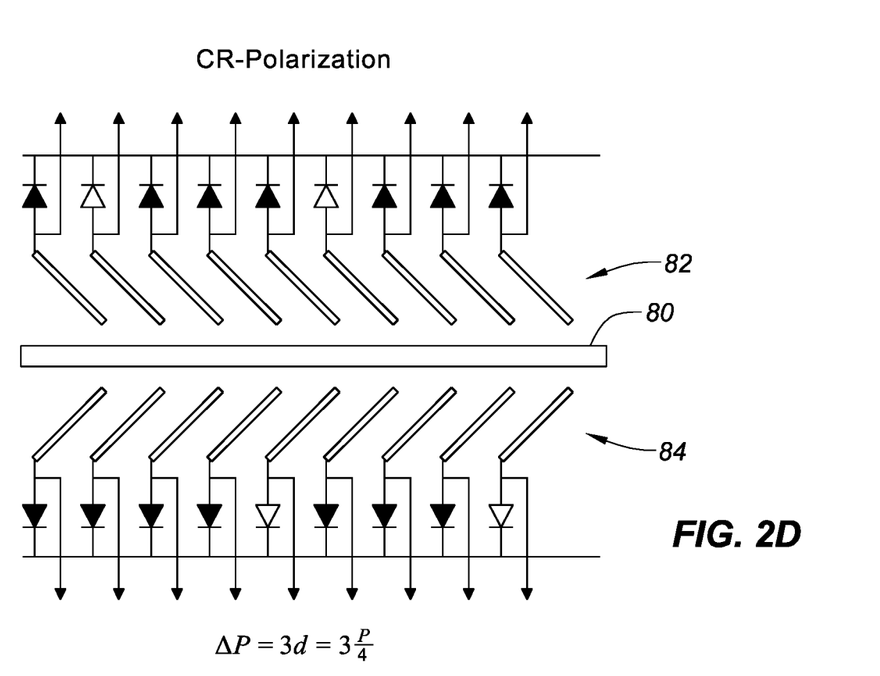

FIG. 2C shows the scatterer pattern in the second array 84 shifted by P/4 (i.e., ΔP=d, where P=4) relative to the scatterers in the first array 82. In this configuration, the resultant output beam is circularly polarized in the clockwise or left-hand direction ("CL" polarization). Similarly, in FIG. 2D, the scatterer pattern in the second array 84 is shifted by 3P/4 (i.e., ΔP=3d, where P=4) relative to the scatterers in the first array 82, yielding circular polarization in the counter-clockwise or anti-clockwise (right-hand) direction ("CR" polarization).

It will be appreciated that any one of the relationships between the respective patterns of the first and second arrays illustrated in FIGS. 2A-2D may be considered the initial relationship or correlation that produces a first type of polarization, and any one of the other relationships may be considered the period-shifted relationship or correlation that produces a second type of polarization.

Figure 3:
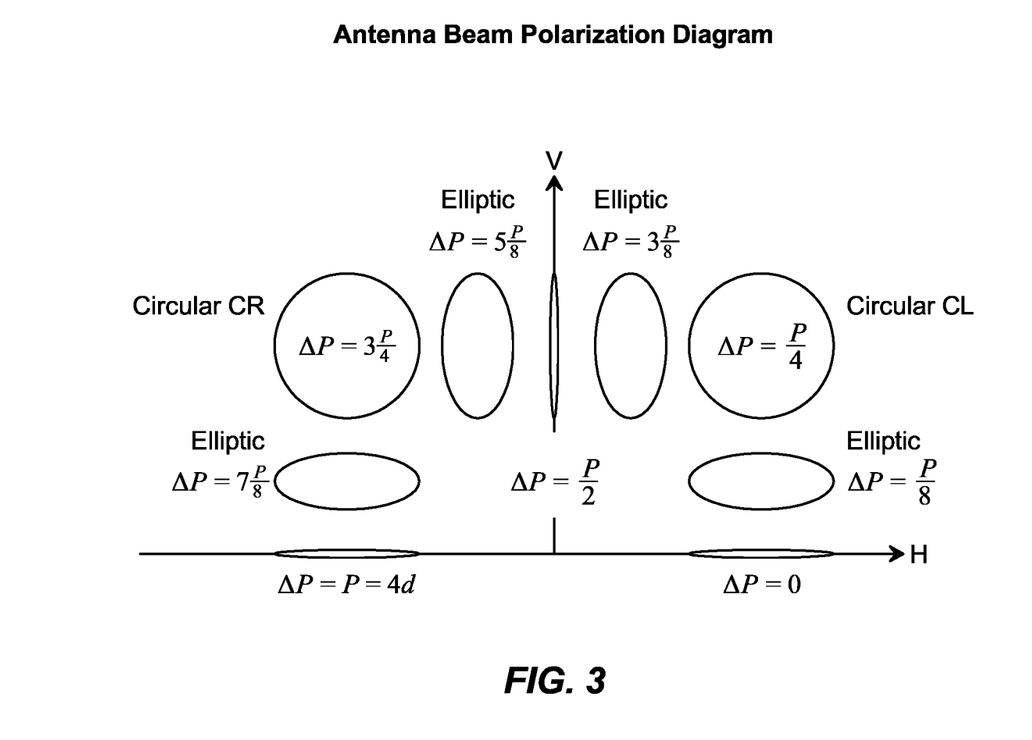
FIG. 3 is a graphical representation showing the polarizations yielded by several different values of $\Delta P$.

FIG. 3 is a graphical representation showing the types of polarizations obtained with different values of ΔP. In this graph, P=4d, for illustrative purposes. From FIG. 3, it can be seen that H polarization is obtained when ΔP=0, and when ΔP=P (i.e., 4d). V polarization is obtained when ΔP=P/2 (i.e., 2d). CR polarization is obtained when ΔP=3P/4 (i.e., 3d); while CL polarization is obtained when ΔP=P/4 (i.e., d).

Where ΔP is not zero, d, or an integral multiple of d, the period shifts (ΔP) will result in polarizations that will deviate from the desired linear or circular polarization. Several such cases are shown in FIG. 3. For example, for an antenna with P=4d, values of ΔP of P/8, 3P/8, 5P/8, or 7P/8 correspond, respectively, to d/2, 3d/2, 5d/2, and 7d/2, and are thus not equal to an integral multiple of d, thereby yielding the illustrated elliptical polarizations. For an antenna with a period of 4d, such elliptical polarizations will be obtained whenever, for example, n is not divisible by 4, and the resulting elliptical shape will resemble most closely whichever "pure" linear or circular polarization would be produced by the integral multiple of d closest to ΔP.

Figure 4:
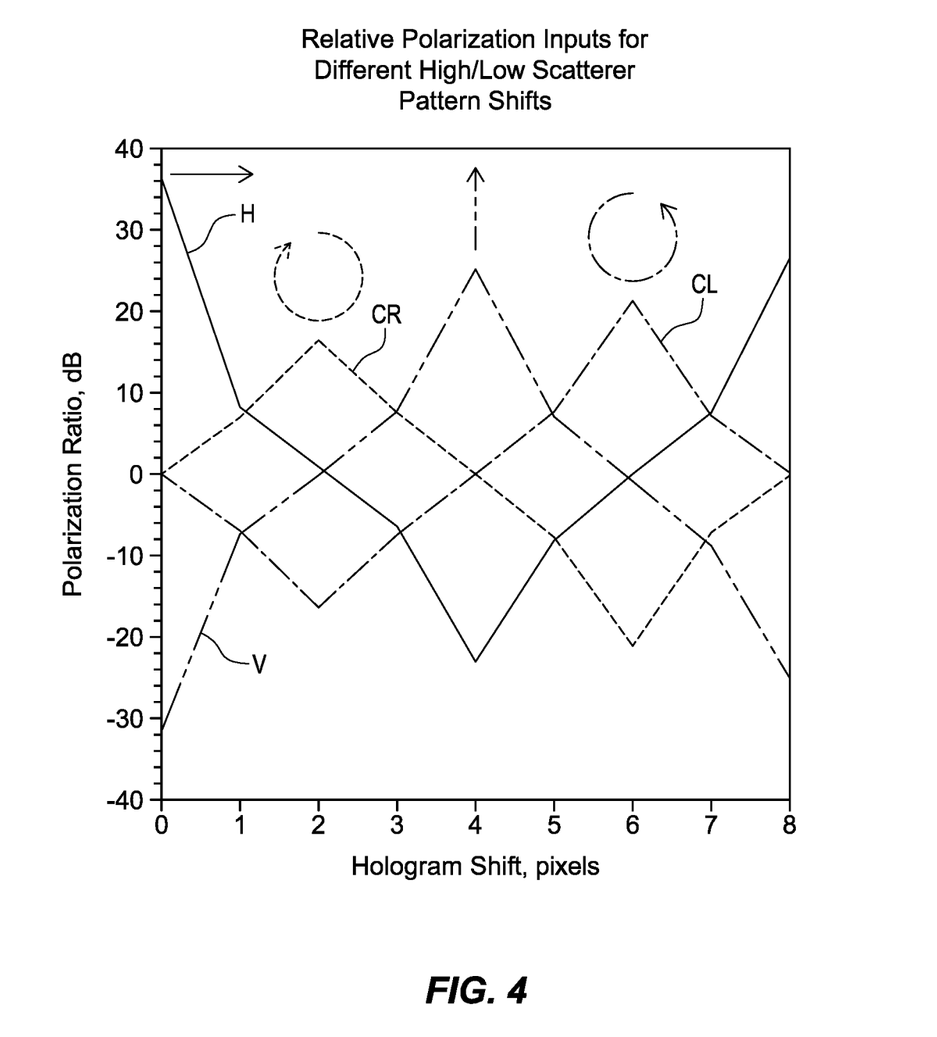
FIG. 4 is a graphical representation of relative polarization components in the antenna beams generated by an antenna in accordance with this disclosure as functions of pattern shift $\Delta P$.

FIG. 4 is a graphical representation of the relative polarization components in antenna beams formed with different period shifts (ΔP) described above and illustrated in FIGS. 2A-2D. For each type of polarization, the polarization ratio (in dB) is shown as a function of the scatterer pattern ("hologram") shift in an array having an 8-pixel (8-scatterer) period (i.e., P=8d). It can be seen from the graph that linear polarization parallel to the X-axis peaks at zero-shift; linear polarization orthogonal to the X-axis peaks at a 4-pixel shift; and left-hand and right-hand circular polarizations peak at shifts of 2 pixels and 6 pixels, respectively.

The controllably variable polarization provided by the above-described embodiments, as will be readily appreciated, is fully implementable in a steerable beam antenna, of the type described in the aforementioned '478 patent, in which the antenna beam direction φ is determined by the period P and the wave propagation speed v in the antenna feed line:

$$\sin\varphi = \frac{c}{v} - \frac{\lambda}{P}$$

where c is the speed of light, and λ is the free-space wavelength of the beam.

Figure 5:
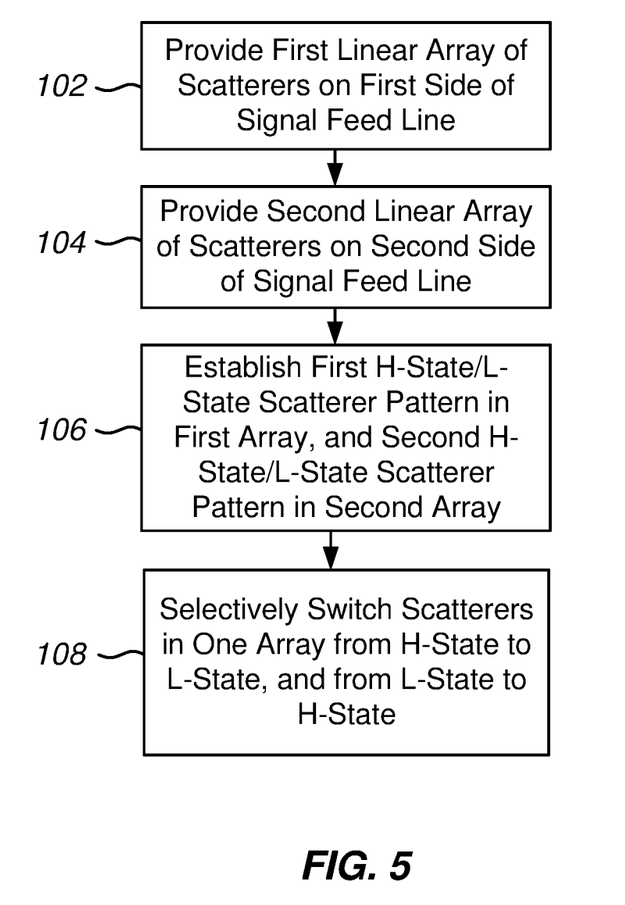
FIG. 5 is a flow chart illustrating a method of controllably varying the polarization of an electromagnetic beam of wavelength $\lambda$ radiated from a steerable beam antenna having an electromagnetic signal feed line defining an axis X, in accordance with an aspect of the disclosure.

FIG. 5 is a flow chart illustrating a method of controllably varying the polarization of an electromagnetic beam of wavelength λ radiated from a steerable beam antenna having an electromagnetic signal feed line defining an axis X in accordance with an aspect of this disclosure. As shown, Step 102 comprises providing a first linear array of scatterers on a first side of the signal feed line parallel to the axis X, wherein each of the scatterers in the first array defines an angle α relative to the axis λ, and wherein the scatterers in the first array are separated by a distance d that is no greater than one-third λ, whereby the scatterers in the first array provide a first scattered beam portion having a first polarization. Step 104 comprises providing a second linear array of scatterers on a second side of the signal feed line opposite the first side, the second array being parallel to the axis X, wherein each of the scatterers in the second array defines an angle —α relative to the axis X, and wherein the scatterers in the second array are separated by the distance d, whereby the scatterers in the second array provide a second scattered beam portion having a second polarization orthogonal to the first polarization. Step 106 comprises establishing a first pattern of high-state scatterers and low state scatterers in the first array and a second pattern of high-state scatterers and low state scatterers in the second array, wherein each scatterer in the first and second arrays is configured in a high state by being connected to ground, and in a low state by being disconnected from ground, wherein each of the first and second patterns is defined by a period P=nd between successive high state scatterers, where n is a positive integer greater than 1, and wherein the first pattern and the second pattern are correlated so as to yield a scattered steerable beam from the antenna having a first type of polarization. Step 108 comprises selectably switching the scatterers of one of the first and second arrays from a high state to a low state and from a low state to a high state so as to shift one of the first and second patterns relative to the other of the first and second patterns by a period shift that yields a second type of polarization different from the first type of polarization.

It will thus be appreciated from the foregoing that the controllable polarization feature disclosed herein can be adapted to a wide variety of steerable beam antenna systems, and that antenna systems employing this feature can be operated to provide controlled polarizations in different sequences as will be suitable to different applications and circumstances. It will therefore be readily understood that the specific embodiments and aspects of this disclosure described herein are exemplary only and not limiting, and that a number of variations and modifications will suggest themselves to those skilled in the pertinent arts without departing from the spirit and scope of the disclosure.

What is claimed is:

1. A steerable beam antenna system operable to produce a steerable antenna beam having a plurality of selectable polarizations, the antenna system comprising:
   a feed line defining an axis X;
   a first array of switchable scatterers disposed along a first side of the feed line parallel to the axis X; and
   a second array of switchable scatterers disposed along an opposite second side of the feed line parallel to the axis X, wherein the second array of switchable scatterers is a mirror image of the first array of switchable scatterers relative to a mirror plane defined by the feed line;
   wherein the first array of scatterers is configured to scatter an electromagnetic wave propagating through the feed line so as to form a first steerable antenna beam portion with a first polarization, and the second array of scatterers is configured to scatter the electromagnetic wave propagating through the feed line so as to form a second steerable antenna beam portion with a second polarization orthogonal to the first polarization;
   wherein each of the scatterers in the first and second arrays is switchable between a high state and a low state, wherein the scatterers in the high state and the scatterers in the low-state in each of the first and second arrays defines a pattern having a period P=nd, where n is the number of scatterers between successive scatterers in the high state and d is the separation distance between adjacent scatterers that is no greater than one-third the wavelength λ of the propagating electromagnetic wave; and
   wherein the scatterers in the first and second arrays are switchable to shift the pattern of scatterers in the high state and scatterers in the low state in at least one of the first and second arrays relative to the pattern of scatterers in the high state and scatterers in the low state in the other of the first and second arrays by a selectable period shift ΔP that yields a steerable antenna beam having a selected polarization from the plurality of selectable polarizations.

2. The steerable beam antenna system of claim 1, wherein the scatterers in the first and second arrays are switchable in response to an electronic control signal.

3. The steerable beam antenna system of claim 1, wherein the selectable period shift ΔP is a multiple of the separation distance d.

4. The steerable beam antenna of claim 3, wherein, when the selectable period shift ΔP is an integral multiple of the separation distance d, a steerable antenna beam polarization is obtained that is one of vertical polarization, horizontal polarization, left-hand circular polarization, and right-hand circular polarization.

5. The steerable beam antenna of claim 1, wherein each scatterer in the first and second arrays is operatively associated with a switching element connectable to ground, and wherein each scatterer in the first and second arrays is switched (a) from the low state to the high state when its associated switching element connects the scatterer to ground, and (b) from the high state to the low state when its associated switching element disconnects the scatterer from ground.

6. The steerable beam antenna of claim 1, wherein all of the scatterers in the first array form an angle α with respect to the axis X, and wherein all of the scatterers in the second array form an angle —α relative to the axis X.

7. The steerable beam antenna of claim 1, wherein the separation distance d is less than λ/4.

8. A method of controllably varying the polarization of an electromagnetic beam of wavelength λ, radiated from a steerable beam antenna having an electromagnetic signal feed line defining an axis X, the method comprising:
- (a) providing a first linear array of scatterers on a first side of the signal feed line parallel to the axis X, wherein each of the scatterers in the first array defines an angle α relative to the axis X, and wherein the scatterers in the first array are separated by a distance d that is no greater than one-third λ, whereby the scatterers in the first array provide a first scattered beam portion having a first polarization;
- (b) providing a second linear array of scatterers on a second side of the signal feed line opposite the first side, the second array being parallel to the axis X, wherein each of the scatterers in the second array defines an angle —α relative to the axis X, and wherein the scatterers in the second array are separated by the distance d, whereby the scatterers in the second array provide a second scattered beam portion having a second polarization orthogonal to the first polarization;
- (c) establishing a first pattern of scatterers in a high-state and scatterers in a low state scatterers in the first array and a second pattern of scatterers in the high-state and scatterers in the low state in the second array, wherein each scatterer in the first and second arrays is configured in the high state by being connected to ground, and in the low state by being disconnected from ground, wherein each of the first and second patterns is defined by a period P=nd between successive scatterers in the high state, where n is a positive integer greater than 1, and wherein the first pattern and the second pattern are correlated so as to yield a scattered steerable beam from the antenna having a first type of polarization; and
- (d) selectably switching the scatterers of one of the first and second arrays from the high state to the low state and from the low state to the high state, so as to shift one of the first and second patterns relative to the other of the first and second patterns by a period shift that yields a scattered steerable beam from the antenna having a second type of polarization different from the first type of polarization.

9. The method of claim 8, wherein the step of selectably switching is performed in response to an electronic signal.

10. The method of claim 9, wherein the electronic signal is received from a controller.

11. The method of claim 8, wherein the first type of polarization is selected from the polarization type group consisting of horizontal polarization, vertical polarization, left-hand circular polarization, and right-hand circular polarization, and wherein the second type of polarization is type of polarization different from the first type of polarization that is selected from the polarization type group.

12. The method of claim 8, wherein the distance d is less than λ/4.

* * * * *